United States Patent [19]

Yamashita et al.

[11] 4,374,398

[45] Feb. 15, 1983

[54] MULTIPLEXED TELEVISION AUDIO SIGNAL RECEIVER

[75] Inventors: Akira Yamashita, Nagaokakyo; Nagai Hiroyuki, Ibaraki, both of Japan

[73] Assignee: Matsushita Electric Industrial Co., Ltd., Osaka, Japan

[21] Appl. No.: 252,182

[22] Filed: Apr. 8, 1981

[30] Foreign Application Priority Data

Apr. 15, 1980 [JP] Japan ................... 55-49691

[51] Int. Cl.³ .................. H04N 5/60; H04B 1/10
[52] U.S. Cl. .................. 358/143; 358/198; 455/212

[58] Field of Search .............. 358/143, 144, 198; 455/212, 213, 222, 225

Primary Examiner—John C. Martin
Attorney, Agent, or Firm—Burgess, Ryan and Wayne

[57] ABSTRACT

In a receiver of the type capable of receiving a second or third subchannel audio signal which contains no pilot signal and which is multiplexed with the television audio signal, only the subchannel signal frequency components pass through a band-pass filter the output of which is fed to a clipper circuit so that the carrier level of the output is suppressed. The output of the clipper circuit is detected whether the subchannel signal is present or absent or subchannel signal is increased so that a squelch circuit is turned off and a display device is turned on or vice versa.

3 Claims, 9 Drawing Figures

MULTIPLEXED TELEVISION AUDIO SIGNAL RECEIVER

FIELD OF THE INVENTION

The present invention relates to a multiplexed television audio signal receiver capable of receiving the signal which is frequency-modulated with a second or third sound to be referred to as the "subchannel signal" in this specification and which is multiplexed with the main audio signal of the television signal to be referred to as the "main channel signal" in this specification. The present invention has for its object to provide a multiplexed television audio signal receiver which is provided with a detection device which can increase a margin for detection of the subchannel signal when the antenna input becomes weak or the television receiver is detuned so that erratic operations can be avoided.

BACKGROUND OF THE INVENTION

Obviously it is very convenient to provide a multiplexed television audio signal receiver with a device for detecting whether the subchannel signal is present or absent in the television signal received and causing a display device to operate when the subchannel signal is present. When the pilot signal for the subchannel signal is also multiplexed, the display device can be turned on in response to the detection of the pilot signal, but when the pilot signal is not present, the display device is turned on in response to the detection of the carrier of the subchannel signal.

The subchannel signal is FM signal so that when the receiveer is detuned or tuned to an unused channel, a subchannel signal demodulation circuit generates the so-called FM noise which is extremely high in level. Even when the receiver is correctly tuned to a channel, the noise level rises suddenly when the antenna input drops below a certain level. In these cases, the display device such as a display lamp is turned off and the demodulated subchannel signal must be squelched or quieted. In the case of the separate-carrier type receiver, the control signal required for turning off the display device and turning on a squelch circuit can be derived from the carrier level of the main channel signal and its tuning characteristics, but in the case of the inter-carrier type receiver it is difficult to obtain such control signal. The subchannel signal is FM signal with a predetermined amplitude level. Therefore, there has been devised and demonstrated a system in which the control signal is derived by the detection of the difference in level between the subchannel signal and the noise. When the receiver is tuned to an unused channel or detuned too far, the difference is large so that the control signal can be obtained, but when the antenna input becomes weak even when tuned correctly or when the receiver is detuned only a little, the difference is less. Moreover, the prior art circuit adapted for detecting such level difference has a relatively gentle threshold level. As a result, even when the antenna input becomes weak or when the receiver is detuned so that the noise level in the demodulated subchannel signal rises, a squelch circuit will not be turned on. Furthermore, other erratic operations tend to occur very often which in turn fail to turn on the squelch circuit. Same is true for the subchannel signal display device.

SUMMARY OF THE INVENTION

In view of the above, the present invention has for its primary object to provide a detection device for a multiplexed television audio signal receiver which most sensitively responds to the increase in noise level when the antenna input becomes weak even when the receiver is correctly tuned or when the receiver is detuned so as to cut off the demodulated subchannel signal and to turn off a display lamp without any erratic operation.

Briefly stated, for the above and other objects, the present invention provides a multiplexed television audio signal receiver of the type capable of receiving a second or third subchannel signal which is not accompanied with the pilot signal and which is multiplexed with the television audio signal, characterized in that the subchannel signal frequency components are separated through a band-pass filter from the received television signal and fed to a clipper circuit so that only the carrier level can be suppressed; and the peak level of the output from the clipper circuit is detected so as to detect whether the subchannel signal is present or absent or subchannel signal is increased so that a squelch circuit is turned off or on while a display device is turned on or off.

The above and other objects, effects and features of the present invention will become more apparent from the following description of a preferred embodiment thereof taken in conjunction with the accompanying drawings.

BRIEF DESCRIPTION OF THE DRAWINGS

Same reference numerals are used to designate similar parts throughout the figures.

DETAILED DESCRIPTION OF THE PREFERRED EMBODIMENT

Figure 1:
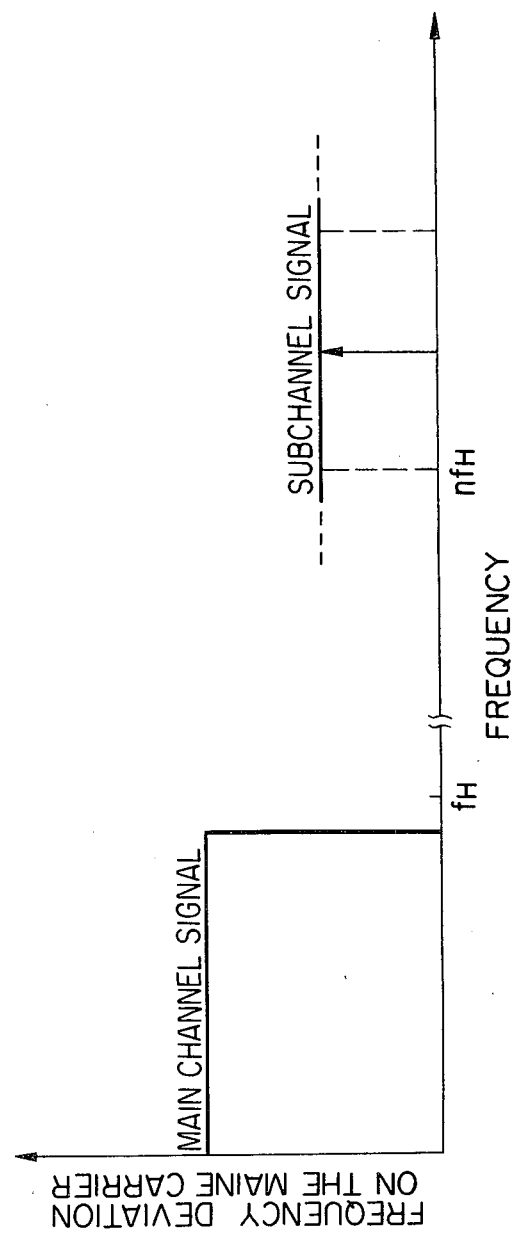
FIG. 1 is a frequency spectrum when the television audio signal is multiplexed with a subchannel FM signal.

FIG. 1 shows the frequency spectrum when the TV audio signal is multiplexed with a subchannel signal. In the case of the inter-carrier system, buzz spectra cluster around the frequencies $nf_H$, where n is an integer and $f_H$ is the horizontal scanning frequency so that in order to reduce interference and beats due to these buzz spectra to a minimum, the center carrier frequency of the subchannel signal is selected as $nf_H$. FIG. 1 also shows the frequency spectrum of the output of a sound detector of a television receiver.

Figure 2:
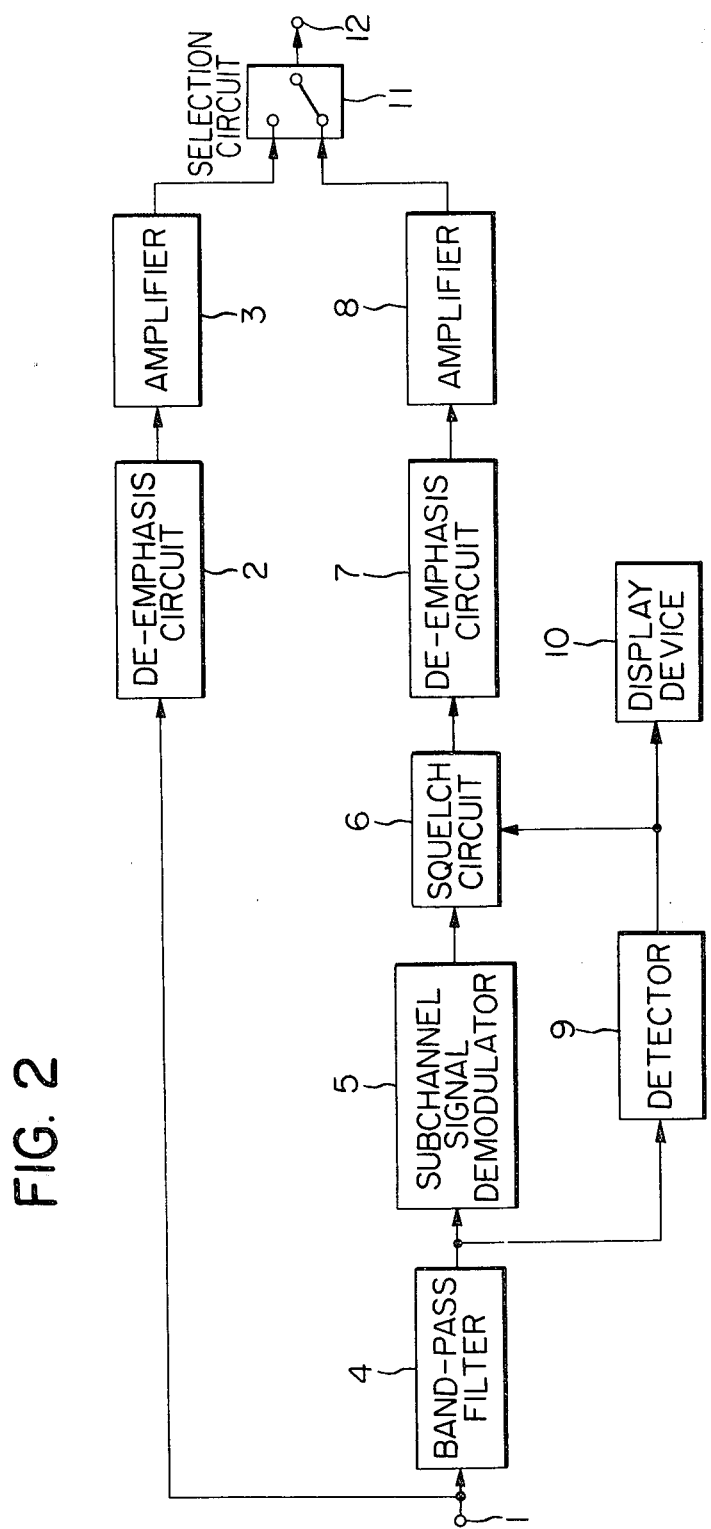
FIG. 2 is a block diagram of a demodulation stage of a television audio signal receiver adapted to receive the multiplexed audio signal as shown in FIG. 1.

FIG. 2 shows a block diagram of a circuit for separting the main channel signal and the subchannel signal from the output of the sound detector and demodulating them. Reference numeral 1 designates an input terminal of the detected audio output signal; 2, a main channel signal de-emphasis circuit; 3, an amplifier; 4, a band-pass filter for passing the subchannel signa; 5, a FM demodulation circuit for the subchannel signal; 6, a squelch circuit; 7, a de-emphasis circuit for the subchannel signal; 8, an amplifier; 9, a detector for detecting the subchannel signal and noise; 10, a display device such as a lamp for displaying the reception of the subchannel signal; 11, a selection circuit for deriving the demodulated main channel output or the demodulated subchannel output; and 12, a demodulated audio signal output terminal.

The main channel signal which is separated from the multiplexed TV audio signal at input terminal 1 is applied to the de-emphasis circuit 2 where the main channel signal is de-emphasized. The output from the de-emphasis circuit 2 is amplified by the amplifier 3 and derived from the output terminal 12 through the selection circuit 11.

The subchannel signal passes through the band-pass filter 4, is demodulated by the FM demodulator 5, passes through the squelch circuit 6 in the case of the normal reception, de-emphasized by the de-emphasis circuit 7, amplified by the amplifier 8 and is derived from the output terminal 12 through the selection circuit 11.

When no subchannel signal is received or when noise is increased when the antenna input is weak or when an unused channel is tuned or in the case of detuning, in response to the output from the detector 9, the demodulated subchannel output is suppressed and the display device 10 is turned off.

Figure 3:
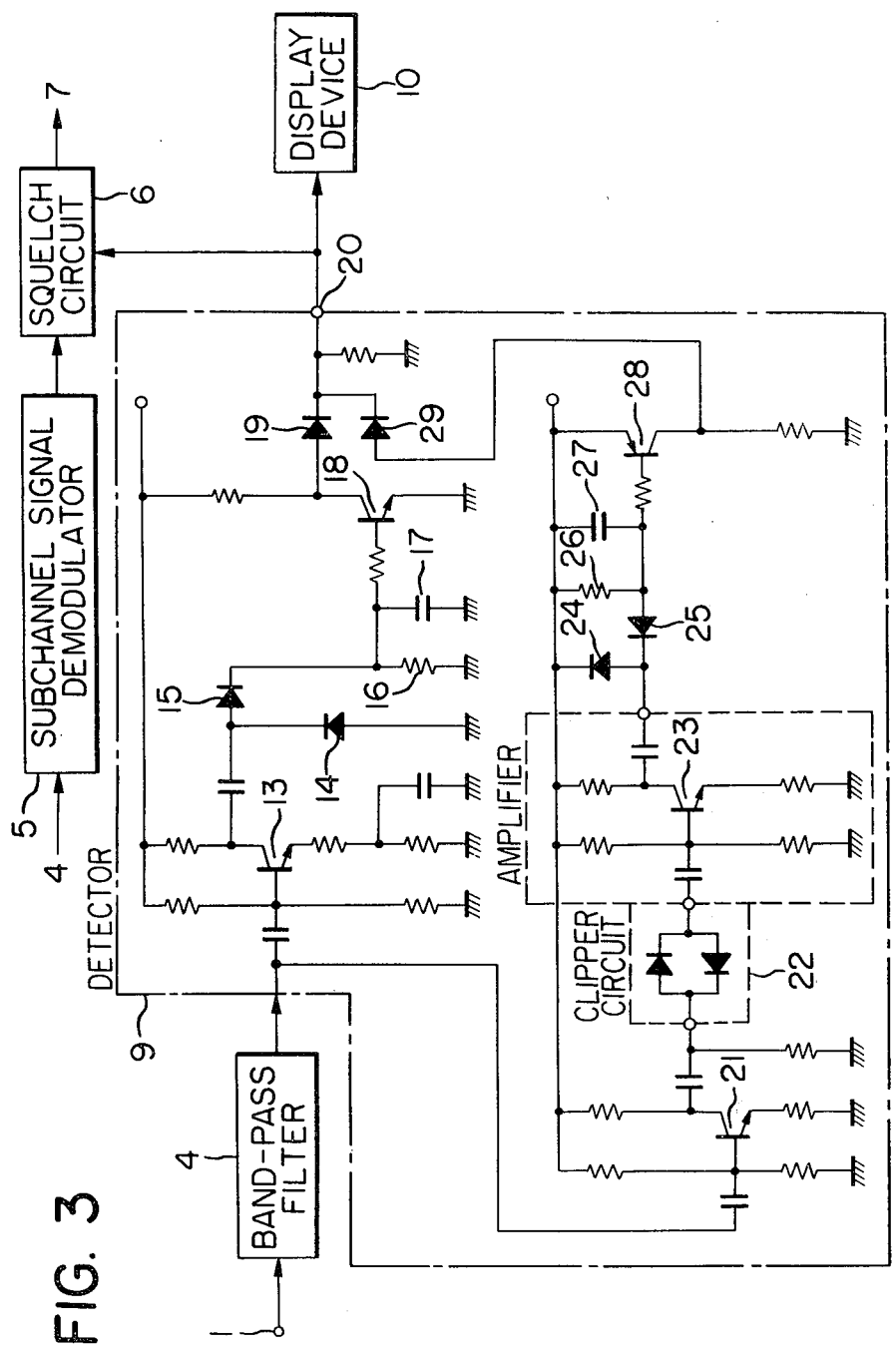
FIG. 3 is a diagram of a circuit for detecting the subchannel signal and noise.
Figure 4A:
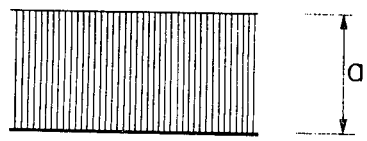
FIGS. 4(A-F) show the waveforms used for the explanation of the circuit shown in FIG. 3.
Figure 4B:

In FIG. 3 is shown a diagram of the detector 9 for detecting the subchannel signal and noise. When the television receiver is tuned to a channel, the subchannel signal passes through the band-pass filter 4 and the amplifier 13 and is fed to diodes 14 and 15 and a time-constant circuit comprising a resistor 16 and a capacitor 17 for peak level detection. The level of the subchannel signal is then detected by a transistor 18. FIG. 4A shows the waveform of the output from the amplifier 13 when the subchannel signal is present and FIG. 4B shows the waveform of the output from the amplifier when the subchannel signal is absent. It is seen that the detected peak level is substantially equal to a in FIG. 4A while it is substantially equal to b in FIG. 4B. The gain of the amplifier 13 is so selected that when the detected peak level is a, the transistor 18 is turned on, but when the detected peak level is b, the transistor 18 is turned off. The output from the transistor 18 is transmitted through a diode 19 to the output terminal of the detector 9. When the television signal is tuned to a channel and the subchannel signal is present, the control signal which is at a low level is derived but when the subchannel signal is absent, the control signal which is at a high level is derived. In response to the high-level control signal the squelch circuit 6 is turned on and the display device 10 is turned off. But when the subchannel signal is being received, that is, when the control signal is at a low level, the display device 10 is turned on and the output from the demodulator 5 is derived from the output terminal 12. When the subchannel signal disappears, the display device is turned off while the squelch circuit 6 is turned on so that no output is derived from the output terminal 12.

Figure 4C:
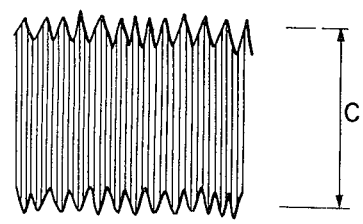
Figure 4D:
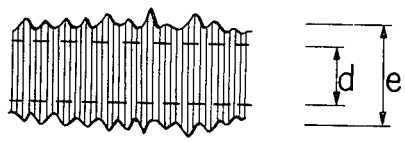

When the antenna input is decreased or the television receiver is detuned, noise in the output from the subchannel signal demodulator 5 is increased. Therefore, it is preferable to suppress the output of the demodulator 5 while turning off the display device 10. In this case, noise is superposed on the waveform shown in FIG. 4A and no control signal can be derived from a detection system comprising elements 13 to 19, but the control signal can be derived from the detecting system comprising elements 21 to 29 shown in FIG. 3. This is the circuit which derives the control signal in response to the detection that noise level has exceeded a predetermined threshold level, the noise level being raised because it is being added to the subchannel signal. More specifically, when the antenna input is decreased or the television receiver is detuned, the output from the band-pass filter 4 is amplified by an amplifier 21 as shown in FIG. 4D. The subchannel signal has a level d when the television signal is correctly tuned to a channel with a normal antenna input, but the level of the output increases as indicated by e when the antenna input is reduced or when the television receiver is detuned. Since the difference between the levels d and e is less, it is difficult to detect the level difference. When the gain of the amplifier 21 is increased, the difference in level between d and e can be increased accordingly. However, with a limited power supply voltage Vcc, the output signal D will be saturated so that the detection of the difference in level between d and e cannot be obtained.

Figure 4E:
Figure 4F:
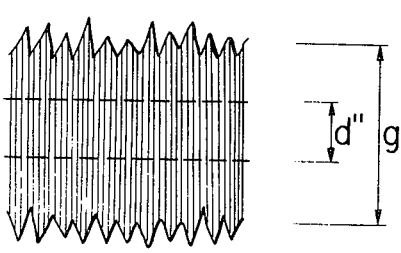

In order to magnify the difference in level between d and e, there are provided a clipper circuit 22 and an amplifier 23. The clipper circuit 22, which is inserted in series, slices the center portion of the output signal D as shown in FIG. 4E. Then the level of the subchannel signal is decreased from d to d', but the noise components added to the subchannel signal remain unchanged. In this embodiment, diodes are used in the clipper circuit 22, but it is to be understood that zener diodes may be used according to the clipping level. The output signal E is amplified by an amplifier 23 so that the output as shown in FIG. 4F is obtained. It is seen that the level g of the subchannel signal superposed with noise is higher than the level d" of the subchannel signal; that is, the difference in level is emphasized. The output signal from the amplifier 23 is fed to diodes 24 and 25 and a time constant circuit comprising a resistor 26 and a capacitor 27 for peak level detection and a transistor 28 detects the level. The gain of the amplifier 23 is so selected that when the level of the waveform F is at d", the transistor 28 is turned off while the level is at g, the transistor 28 is turned on. Then, in case of the reception of a weak antenna input or of detuning so that noise level is increased, the output from the transistor 28 rises high and fed through a diode 29 and an output terminal 20 to the squelch circuit 6 so as to turn on the same, whereby the output from the demodulator 5 is cut off and the display device 10 is turned off. When the television receiver is turned correctly, however, the squelch circuit is turned off while the display device 10 is turned on.

When the television receiver is tuned to an unused channel, the FM detection output with high noise is applied to the input terminal 1. Then the output signal from the amplifier 21 has a high level as shown in FIG. 4C. As a result the high-level signal is derived from the output terminal 20 of the detection system comprising elements 21 to 29, so that the squelch circuit 6 is turned on. As a result, the output with high noise level from the demodulator 5 is cut off and the display device 10 is turned off.

In summary, when the television receiver is tuned to an unused channel, high-level noise generated in the subchannel signal demodulation circuit is cut off while the display device for displaying the reception of the subchannel signal is turned off. In the case of the reception of a weak antenna input or detuning, the difference in level between noise and subchannel signal is increased so as to increase the detection margin. As a result, erratic operations of the squelch circuit and the display device can be avoided; that is, reliable and dependable operations of the squelch circuit and the display device can be ensured.

What is claimed is:

1. A multiplexed television audio signal receiver of the type capable of receiving by the inter-carrier system the television multiplexed audio signals comprising the main audio signal multiplexed with a second or third FM subchannel signal, characterized by the provision of (a) a band-pass filter for extracting the FM subchannel signal,
  (b) a clipper circuit for suppressing only the carrier level of the output from said band-pass filter,
  (c) a detector for detecting the output from said clipper circuit so as to detect the noise level, and
  (d) a squelch circuit responsive to the output from said detector for cutting off the demodulated subchannel signal.

2. A multiplexed television audio signal receiver as set forth in claim 1 further characterized in that
  said detector is a peak-level detector.

3. A multiplexed television audio signal receiver as set forth in claim 1 further characterized by the provision of
  a circuit responsive to the output from said detector for turning off a display lamp which displays the reception of the subchannel signal when turned on.

* * * * *